Figure 1:
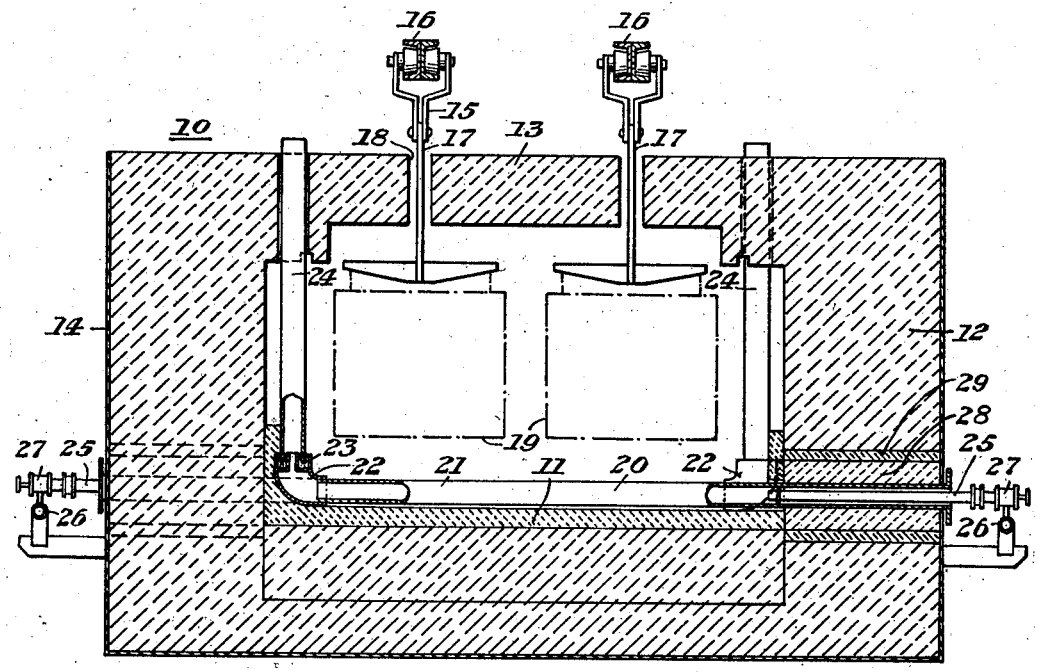

July 13, 1937.    L. WILSON ET AL    2,086,971
ENAMELING FURNACE
Filed Feb. 19, 1936

INVENTORS
Lee Wilson &
James C. Woodson
by their attorneys
Stebbins Blenko & Parmelee Patented July 13, 1937

2,086,971

UNITED STATES PATENT OFFICE 2,086,971

ENAMELING FURNACE

Lee Wilson and James C. Woodson, Cleveland, Ohio; said Woodson assignor to said Wilson Application February 19, 1936, Serial No. 64,659

4 Claims. (Cl. 25—142)

This invention relates to a furnace and, in particular, to a furnace which is specially adapted for enameling, although it has other applications as well.

Enameling is now generally carried out in continuous furnaces and, while considerable improvement has been made in the apparatus for handling and conveying the ware to be enameled through the furnace, in most instances the heat is supplied by plain burners extending through the side walls of the furnace adjacent the hearth. It is desirable in enameling to supply more of the heat below the ware than elsewhere. While the previous burner construction has tended generally toward this end, it has not been capable of any satisfactory degree of control. The combustion gases, furthermore, have direct contact with the ware, which is sometimes undesirable.

We have invented a furnace and a method of construction and operation which largely overcomes the aforementioned objections and produces other novel results, which will be specifically pointed out hereinafter. In accordance with our invention, we provide heat radiating means on the floor or hearth of a tunnel type furnace having side walls and a roof, and additional heat radiating means adjacent the side walls. The heat radiating means may be of any desired character but in a specific form of the invention, we employ heat-exchange tubes and provide means for delivering heat conveying fluid thereto. Preferably, the heat-exchange tubes extend alternately through opposite side walls of the furnace, transversely of the hearth, and upwardly of the side walls thereof. In this way, twice as much heat radiating surface is provided on the hearth per unit length of the furnace as on each side wall.

Figure 2:
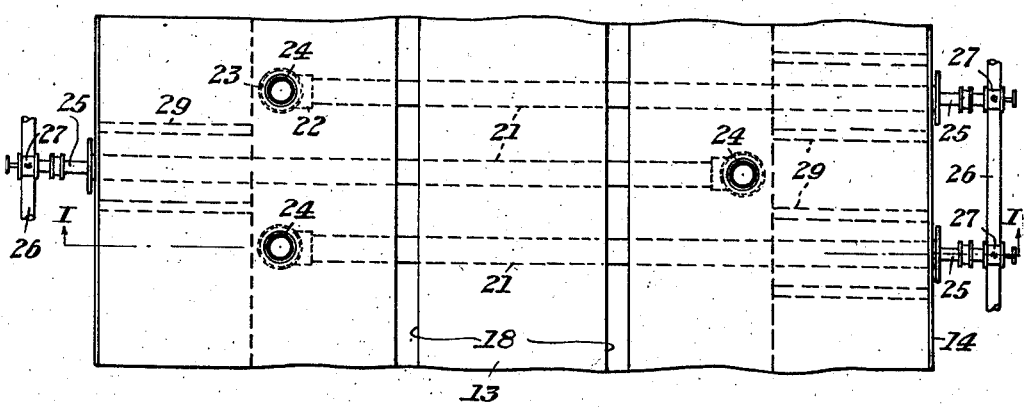

For a complete understanding of the invention, reference is made to the accompanying drawing illustrating a present preferred embodiment, although the furnace illustrated is to be taken as illustrative only and not in any sense limiting the invention, since other forms thereof may be embodied within the scope of my broader claims. In the drawing:

Figure 1 is a transverse sectional view of a furnace in accordance with the invention; and Figure 2 is a partial plan view.

Referring now in detail to the drawing, a furnace 10 comprises a hearth 11, side walls 12 and a roof 13 composed of refractory brick assembled within a metal supporting frame 14. Conveyors in the form of trolleys 15 are movable along rails 16. Hangers 17 extend downwardly from the trolleys 15 through slots 18 in the roof of the furnace for supporting ware indicated at 19 while it passes through the furnace.

Heat radiating means 20 are disposed on the hearth 11 and interiorly of the side walls 12. In the form of the invention shown, the heat radiators 20 comprise metallic tubes adapted to conduct heat conveying fluid over the furnace hearth and upwardly along the side walls. Each radiator 20 includes a horizontal portion 21 extending through a side wall of the furnace and having an elbow 22 thereon with a sealing channel 23 formed at its upper end. A vertical portion 24 extends downwardly through a suitable opening in the roof 13 into the seal 23 of each horizontal portion 21.

Burners 25 project into the outer ends of the tube portions 21 and are supplied with fuel through headers 26 under the control of valves 27. As shown in Figure 2, alternate horizontal tube portions 21 extend inwardly through opposite side walls of the furnace. For each unit of length of the furnace, therefore, there are two horizontal transverse tube portions on the hearth and one on each side wall. This gives the desired ratio of approximately 2 to 1 between the heat delivered from below and that supplied from the side of the ware.

Fuel supplied from the headers 26 through the valves 27 and the burners 25, of course, undergoes combustion in the tube portions 21 and 24, air for supporting combustion being induced through the open outer end of the tube portion 21. The combustion gases are discharged from the upper ends of the tube portions 24 serving as stacks. The seals 23 prevent the combustion gases from leaking out into the furnace chamber proper, and since they are confined at all times in the tube portions 21 and 24, they do not come in contact with the ware.

The invention greatly facilitates furnace construction and particularly the modernization of existing furnaces by the replacement of conventional burners with radiators of the type shown. The horizontal tube portions 21 have their outer ends seated in large refractory bricks 28 which are sealed into the wall by a layer of brick indicated at 29. After removing the burners from existing furnaces, it is thus very simple to insert the horizontal tube portions 21 through suitable openings in the side wall of the furnace and brick up around the outer end of the tube portion. The tube portion 24 may then be lowered through an opening formed in the roof so that it communicates with the tube portion 21 and forms a seal at 23. Similarly, the radiators may be very easily replaced after installation and even while the furnace is hot. Another advantage of the construction shown is that free expansion of both the tube portions 21 and 24 is permitted without introducing any strain upon either, since the joint therebetween is loose, being closed only by the sand seal 23.

It will be apparent from the foregoing that the invention provides a furnace having numerous novel features and particularly adapted for enameling. The advantages of the furnace and method of construction and operation described have already been mentioned, including the proper theoretical distribution of heat between the hearth and the side walls of the furnace, the ease of installation of the radiators, as well as their replacement, the possibility of expansion of the radiator portions, and the avoidance of contact between the heating gases and the ware being heated.

While we have illustrated and described only one preferred form of the invention, it will be obvious that other embodiments and practice thereof may be resorted to within the scope of the following claims. The radiators, for example, instead of being heated by hot combustion gases, may be electrical resistors connected to a suitable current source.

We claim:

1. A furnace comprising an elongated chamber through which material to be heated is adapted to be moved, said chamber having a floor or hearth and side walls, heat-exchange tubes extending through one side wall transversely of said floor or hearth and upwardly along the other side wall, and means for supplying heating fluid to said tubes.

2. The apparatus defined by claim 1 characterized by the upwardly extending portions of said tubes being separable from the transversely extending portions thereof.

3. A furnace comprising an elongated chamber through which material to be heated is adapted to be moved, said chamber having a floor or hearth and side walls, heat radiators extending continuously across said floor or hearth and upwardly along said side walls, and means for supplying a heating fluid to said radiators, said radiators alternately extending from opposite sides of said chamber whereby to supply more heat at said floor or hearth than along either of said side walls.

4. The apparatus defined by claim 1 characterized by the unwardly extending portions of said tubes being separable from the transversely extending portions thereof, and means sealing the joint between said portions.

LEE WILSON.
JAMES C. WOODSON.